(No Model.)
K. LEHMANN.
PNEUMATIC WHEEL TIRE.
No. 480,595. Patented Aug. 9, 1892.
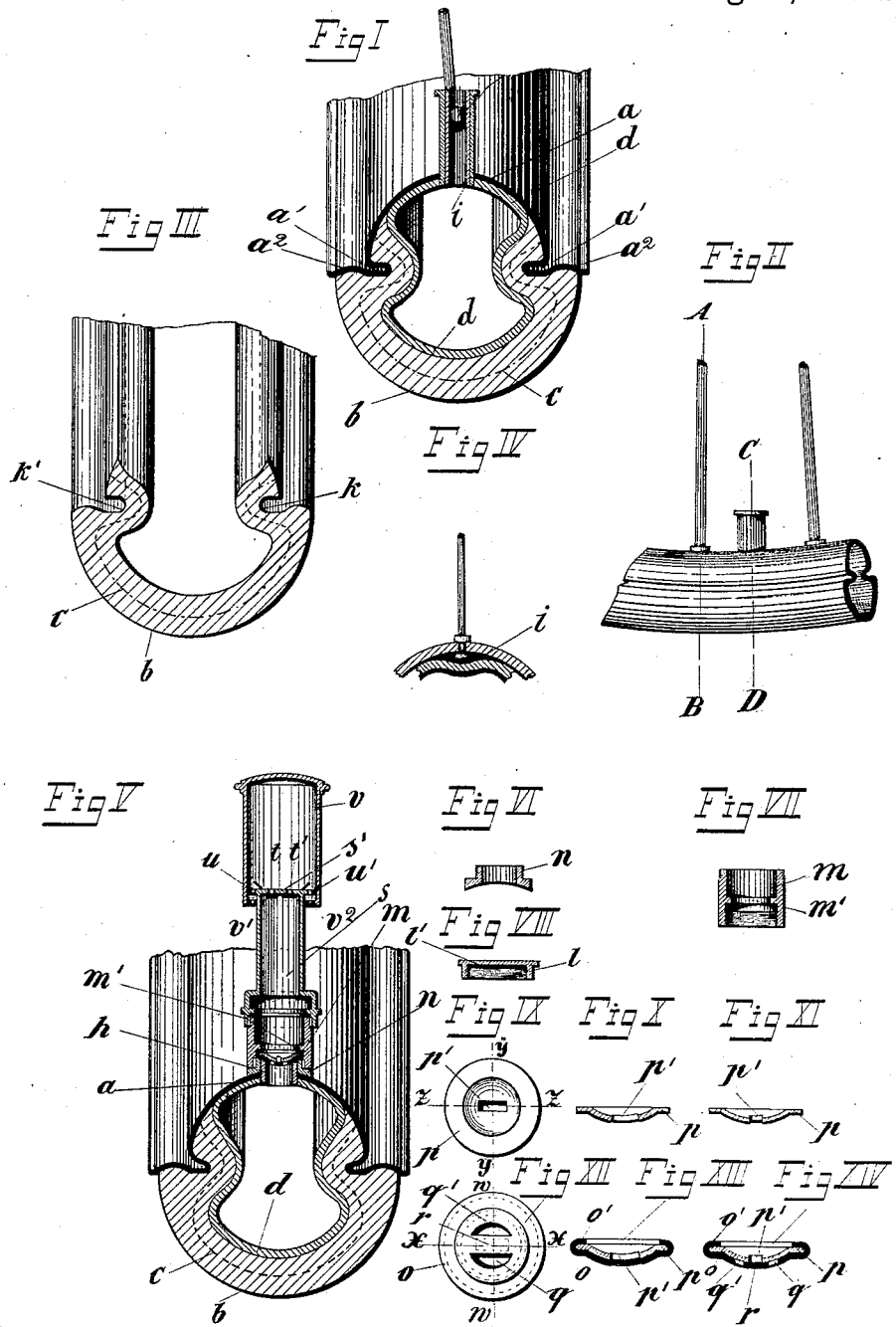
Witness:
James F. Duhamel
Horace A. Dodge
KARL LEHMANN,
Inventor,
Dodge & Sons
Attys

UNITED STATES PATENT OFFICE.

KARL LEHMANN, OF BERLIN, GERMANY.

PNEUMATIC WHEEL-TIRE.

SPECIFICATION forming part of Letters Patent No. 480,595, dated August 9, 1892.

Application filed January 9, 1892. Serial No. 417,518. (No model.)

*To all whom it may concern:*

Be it known that I, KARL LEHMANN, law student, of Berlin, in the Kingdom of Prussia and German Empire, have invented a new and useful Improvement in Pneumatic Tires, of which the following is a specification, reference being had therein to the accompanying drawings.

This invention relates to pneumatic tires for cycle and other wheels; and its objects are to diminish the liability of the air-tubes to burst or puncture, and in the event of a leak occurring to facilitate the removal of the outer band or tread of the tire to allow of an easy and speedy repair. The method of attaching the tire to the rim of the wheel and the shape of the rim also minimize the danger of punctures or of cuts which may be caused by the rim itself.

The annexed drawings, to which reference is hereinafter made, illustrate the construction of the tire and its attachment to the rim.

In the drawings, Figure I shows a cross-section of the rim and tire; Fig. II, a side elevation of part of the tire; Fig. III, a section of the outer band or tread of the tire; Fig. IV, a section along the line A B, Fig. II; Fig. V, a section of the tire and of the inflating-pump and valve; and Figs. VI, VII, and VIII illustrate parts of the valve before being screwed together. Fig. IX is a plan of the valve-disk; Fig. X, a section along the line $z$ $z$, Fig. IX; Fig. XI, a section along the line $y$ $y$, Fig. IX; Fig. XII, a plan of the india-rubber disk attached to the valve-disk; Fig. XIII, a section along the line $x$ $x$, Fig. XII; and Fig. XIV is a section along the line $w$ $w$, Fig. XII.

The rim $a$ of the wheel is approximately semicircular in cross-section, and its edges are first bent inward, as shown at $a'$, and then outward, as shown at $a''$, so that together they act as a clip and support for the tread, Fig. III. As an alternative to bending or forming the parts $a'$ $a''$ from the rim itself, these parts may be separately formed and secured to the edges of the rim by welding, brazing, or other suitable means.

The air-tube $d$, which is made from india-rubber and is formed with one diameter much shorter than another, is placed in the rim so that its upper half is contained in the rim and its lower half is within and protected by the band or tread $b$. Suitable grooves $k$ $k'$ are formed in the tread to fit the inwardly-projecting part $a'$ of the rim, and shoulders are formed to adapt themselves to the supporting-pieces $a''$. Upon the inflation of the air-tube the tire and rim are securely fastened together. Strong cloth, yarn, or other suitable material is inserted in the substance of the tread, so as to increase the resistance to the passage through the rubber of glass, nails, tacks, or other articles capable of piercing the tire and causing a leak.

To prevent damage to the air-tube by abrasion or nipping against the heads of the spokes, elastic protecting rings or pads $i$ are provided, which inclose or partly inclose the air-tube and occupy positions between it and the spoke-heads. (See Fig. IV.)

The valve for inflating the tire consists of the parts shown in detail by Figs. VI to XIV. The nozzle $n$, Fig. VI, forming the lower part of the valve, is soldered or similarly secured to the rim, so that the passage through it coincides with a hole bored through the rim. A short india-rubber tube leads from the air-tube of the tire into the opening in $n$, and an air-tight joint is made of cement or by compressing the end of the tube $b$ between the non-return disk-valve $p$ and the top of the nozzle $n$. The disk-valve is placed upon the top of the piece $n$ and is securely held in place by the short tube $m$, which screws upon $n$. The stop cap or cover $l$ contains an india-rubber-lining piece $l'$, and is screwed upon the tube $m$, so as to hermetically seal it and prevent leakage. When it is required to inflate the valve, the cap $l$ is removed and the air-pump is screwed in its place.

The non-return disk-valve is illustrated in detail in Figs. IX to XIV, inclusive, and consists of a metal disk $p$, furnished with a slot $p'$, and an india-rubber disk $o$, perforated at $q$ $q'$, the solid part $r$ of the india-rubber disk covering the slot in the metal disk. Owing to the convex form of the disk $p$, the india-rubber is tightly stretched upon it, and under normal conditions hermetically seals the opening $p'$.

The air-pump, which is screwed upon the tubular part $m$, consists of the tube $s$, the cap of which $s'$ is fitted with the valves $t$ $t'$ and $u$ $u'$. The cylinder $v$ slides upon the tube $s$ and has air-admission holes $v\ v''$. Upon the depression of the cylinder $v$ the air contained within it passes through the valves $t\ t'$ into the tube $s$ and thence to the air-tube of the tire, after raising the india-rubber disk $o$ from its seat on the disk $p$. During this motion the valves $u$ and $u'$ have been closed. During the return stroke of the pump these valves open, the valves $p$ and $t\ t'$ being kept closed by the respective pressures of the air contained in the tire and the tube $s$. The pump is thus filled with air at the atmospheric pressure, which is forced into the tire by the next stroke of the pump.

A tire constructed to embody these improvements first has its air-tube and then tread placed in position, so that upon the inflation of the tire the grooves $k\ k'$, formed in the tread, engage with the part $a'$ of the rim and securely bind the tire to the wheel. Owing to one-half of the air-tube being contained in the rim itself, there is little risk of the tube bursting by a sudden local pressure.

Cutting of the tire by the edges of the rim is entirely obviated, as there are no sharp edges, the greater part of the weight being transmitted to the tread through the outwardly-bent flat part of the rim $a''$.

If at any time it is necessary or desirable to repair the air-tube, this may easily be effected by allowing the air to escape, when the tread can easily be removed from the wheel.

What I claim, and desire to secure by Letters Patent of the United States, is—

1. The herein-described non-circular tire, comprising the inner air-tube $d$, having the re-entering sides, and a heavier tread portion $b$, embracing the outer portion and sides of the tube, and having inwardly-projecting edges to enter the sides of the tube, and shoulders adapted to bear upon the rim, all substantially as shown and described.

2. In combination with the rim having the curved seat, the inwardly-projecting parts $a'$ and the outwardly-projecting parts $a^2$, the tire provided with the side grooves $k'$ to receive the inwardly-projecting parts of the rim, and a shoulder upon which the outwardly-projecting parts of the rim rest, all substantially as shown and described.

3. In combination with the rim having the curved seat and the inwardly and outwardly projecting portions, the air-tube $d$, having re-entering sides and seated in the rim, and the tread portion $b$, covering the exposed part of the air-tube and provided with side grooves $k'$, all substantially as shown and described.

In witness whereof I have hereunto set my hand in presence of two witnesses.

KARL LEHMANN.

Witnesses:
PAUL FISCHER,
PAUL BRINTZMANN.